United States Patent [19]
Yamaguchi

[11] Patent Number: 6,060,789
[45] Date of Patent: May 9, 2000

[54] POWER SUPPLY SWITCHING CIRCUIT FOR PORTABLE EQUIPMENT

[75] Inventor: Shizuo Yamaguchi, Sayama, Japan

[73] Assignee: Citizen Watch Co., Ltd., Tokyo, Japan

[21] Appl. No.: 09/117,660

[22] PCT Filed: Apr. 23, 1997

[86] PCT No.: PCT/JP97/01401

§ 371 Date: Aug. 4, 1998

§ 102(e) Date: Aug. 4, 1998

[87] PCT Pub. No.: WO98/30950

PCT Pub. Date: Jul. 16, 1998

[30] Foreign Application Priority Data

Jan. 14, 1997 [JP] Japan .................................. 9-004487

[51] Int. Cl.[7] ...................................................... H02J 7/36
[52] U.S. Cl. .................. 307/66; 307/86; 307/64
[58] Field of Search .............. 361/78, 86, 93.1, 361/101; 307/43–44, 48–49, 51, 64, 65, 66, 85, 86; 365/228, 229, 226, 227

[56] References Cited

U.S. PATENT DOCUMENTS

| 5,058,075 | 10/1991 | Mizuta ......................................... 365/229 |
| 5,267,211 | 11/1993 | Kobayashi et al. ........................ 365/228 |
| 5,307,318 | 4/1994 | Nemoto ....................................... 365/226 |
| 5,687,129 | 11/1997 | Kim ............................................. 365/229 |
| 5,761,061 | 6/1998 | Amano ......................................... 364/187 |

FOREIGN PATENT DOCUMENTS

| 2-2474 | 1/1990 | Japan . |
| 2-139649 | 5/1990 | Japan . |
| 6-342326 | 12/1994 | Japan . |
| 8-161086 | 6/1996 | Japan . |

*Primary Examiner*—Jeffrey Gaffin
*Assistant Examiner*—Kim Huynh
*Attorney, Agent, or Firm*—Smith, Gambrell & Russell, LLP

[57] ABSTRACT

Voltage obtained by dividing the voltage of an external power source (101) by means of resistors (108, 109) is supplied to the gate of a first FET (107) that is interposed between two series-connected built-in batteries (103, 104). When the voltage at a predetermined level or above is supplied from the external power source (101), the first FET (107) is turned off, a second FET (110), which is provided between the built-in batteries (103, 104) and a load (113), is also turned off, and the voltage is supplied to the load (113) only from the external power source (101).

7 Claims, 3 Drawing Sheets

POWER SUPPLY SWITCHING CIRCUIT FOR PORTABLE EQUIPMENT

TECHNICAL FIELD

The present invention relates to a power switching circuit used for a card-type portable device, such as a memory card, which has a plurality of batteries built-in, and more particularly, to a power switching circuit for a portable device designed so that the source of power supply to a card-type portable device can be switched from built-in batteries to an external power source without causing dissipation of the built-in batteries.

BACKGROUND ART

Card-type portable devices based on the PCMCIA (Personal Computer Memory Card International Association) standards are used as portable devices that have batteries built-in. If a card-type portable device is inserted in a personal computer, data are transferred from the personal computer to the card-type portable device. A power source then used for the operation of the card-type portable device is supplied from the personal computer side. Built-in batteries are used as a power source for the operation of the card-type portable device after the card-type portable device to which the data are transferred is separated from the personal computer. Accordingly, the card-type portable device requires use of a power switching circuit for selecting the source of power supply, an external power source (power source on the personal computer side) or built-in batteries.

FIGS. 6 and 7 individually show two prior art examples of the power switching circuit used in a portable device.

In a first example shown in FIG. 6, an external power source 601 (e.g., 5 V) is connected to a portable device body 613 through a switch 602 and a diode 611. Further, a built-in battery 604 (e.g., 3 V) is connected to the portable device body 613 through a diode 610.

In the case where the portable device is separated from the rest, the switch 601 is opened, so that the portable device body 613 is supplied with power from the built-in battery 604 through the diode 601. As this is done, the diode 611 prevents current from flowing out of the built-in battery 604.

When this switch is closed so that the external power source 601 is also connected to the portable device body 613 through the diode 611, on the other hand, the voltage of the external power source 601 is supplied to the portable device body 613 only in the case where the voltage of the external power source 601 is higher than the voltage of the built-in battery 604. At this time, the diode 610 prevents the external power source from charging the built-in battery 604.

In a second example shown in FIG. 7, a field-effect transistor (hereinafter referred to as FET) is used between a built-in battery and a portable device body. An external power source 701 (e.g., 5 V) is connected to a portable device body 713 through a switch 702 and a diode 711. On the other hand, a built-in battery 704 (e.g., 3 V) is connected to the portable device body 713 through a P-channel FET 710.

The source and drain of the P-channel FET 710 are connected to the portable device body 713 and the built-in battery 704, respectively. Further, the gate of the FET 710 is connected to the external power supply switch 702, and is also connected to the negative electrode of the built-in battery 704 through a bias resistor 709. The negative electrode of the built-in battery 704 is connected to the negative electrode of the external power source 701 and the negative-electrode-side terminal of the portable device body 713.

When the external power supply switch 702 is open, the drain of the FET 710 is connected to the positive electrode, 3 V, of the built-in battery 704, while the gate thereof is connect to the negative electrode, 0 V, of the built-in battery 704 through the bias resistor 709. Further, the source of the FET 710 is adjusted substantially to the drain voltage (3 V) by means of a drain-source parasitic diode. In consequence, the source-gate voltage is at −3 V. Accordingly, the FET 710 is turned on, so that the voltage (3 V) of the built-in battery 704 continues to be supplied to the portable device body 713. As this is done, the diode 711 prevents current from flowing out of the built-in battery 704.

When the external power supply switch 702 is closed, on the other hand, the gate and source of the FET 710 are adjusted to the voltage, 5 V, of the external power source 701, and the drain thereof to the voltage, 3 V, of the built-in battery 704. In consequence, the source-gate voltage is at 0 V. Accordingly, the FET 710 is turned off, so that the voltage of the built-in battery 704 is prevented from being supplied to the portable device body 713, and the voltage, 5 V, of the external power source 701 is supplied to the portable device body 713 through the diode 711. At this time, the parasitic diode of the off-state FET 710 prevents the built-in battery 704 from being charged with the voltage of the external power source 701.

In many conventional personal computers, 5 V is supplied to a PCMCIA card interface. In many cases, on the other hand, PCMCIA memory cards that are adapted to be inserted into personal computers have 3-V coin-type lithium batteries built-in. Thus, in a card-type portable device, the voltage of the external power source is higher than the voltage of the built-in battery, so that the aforesaid two prior art examples are applicable. While the external power source is being supplied, the built-in battery can be prevented from being dissipated wastefully.

In view of working power, it is advisable to use some card-type portable devices at 6 V with two 3-V coin-type lithium batteries that are connected in series. In this case, however, the voltage (5 V) of the external power source is lower than the voltage (6 V) of the built-in batteries, so that the card-type portable devices of this type cannot be used in combination with a conventional personal computer in which 5 V is supplied to the PCMCIA card interface.

DISCLOSURE OF THE INVENTION

The object of the present invention is to provide a power switching circuit for a portable device, in which two or more built-in batteries are connected in series, and which is designed so that the voltage of an external power source for the portable device can be supplied to the portable device without causing dissipation of the built-in batteries if the voltage of the external power source for the portable device, although lower than the voltage of the built-in batteries, is not lower than a fixed level.

In order to achieve the above object, a power switching circuit according to the present invention comprises a power supply line for supplying power from an external power source and power from a built-in battery to the body of a portable device, a first switching device interposed between the built-in battery and the portable device body, and an external power-supply voltage detection circuit which receives the value of voltage supplied from the external power source and delivers a first signal for turning off the first switching device when the voltage is higher than a predetermined level or delivers a second signal for turning on the switching device when the voltage is not higher than the fixed level.

Preferably, the switching device is a P-channel field-effect device, the drain, source, and gate of which are connected to the built-in battery, the power input side of the portable device body, and the external power-supply voltage detection circuit, respectively. When voltage not lower than the fixed level is supplied from the external power source to the source of the P-channel field-effect device and also to the gate through the external power-supply voltage detection circuit, the source-gate voltage difference is not greater than a threshold value for the P-channel field-effect device, so that the P-channel field-effect device is turned off. Accordingly, only the voltage of the external power source is supplied to the portable device body. When the external power source is disconnected from the portable device body or when the supplied voltage from the external power source is lower than the fixed level, on the other hand, the threshold value is exceeded by the source-gate voltage difference, so that the P-channel field-effect device is switched on, and the voltage of the built-in battery is supplied to the portable device body.

Preferably, moreover, both the switching device and the external power-supply voltage detection circuit are P-channel field-effect devices. The drain, source, and gate of the field-effect device of the switching device are connected to the external power source, the input side of a constant-voltage regulator, and the output side of a level shifter, respectively. Further, the drain, source, and gate of the field-effect device of the external power-supply voltage detection circuit are connected to the input side of the level shifter, the external power source, and the output side of the constant-voltage regulator, respectively. When voltage not lower than the fixed level is supplied from the external power source to the field-effect device of the external power-supply voltage detection circuit, a threshold value for this field-effect device is exceeded by the source-gate voltage, the field-effect device is switched on. In consequence, the voltage of the external power source is applied to the level shifter through the field-effect device. Thereupon, this level shifter turns on the field-effect device as the switching device, and turns off a switching device interposed between the built-in battery and the input side of the constant-voltage regulator. Accordingly, the voltage of the external power source is supplied to the constant-voltage regulator, and this constant-voltage regulator supplies a constant voltage to the portable device body. When the external power source is disconnected from the portable device body or when the supplied voltage from the external power source is lower than the fixed level, on the other hand, the respective on-off states of those switching devices are changed, so that only the voltage of the built-in battery is applied to the constant-voltage regulator.

BEST MODE FOR CARRYING OUT THE INVENTION

Description of First Embodiment

Referring to the block diagram of FIG. 1, there will be described a first embodiment of a power switching circuit in a state where power of an external power source is supplied from the body of a personal computer to a card-type portable device that has batteries built-in and an interface based on the PCMCIA standards.

(1) Construction of the Power Switching Circuit

Figure 1:
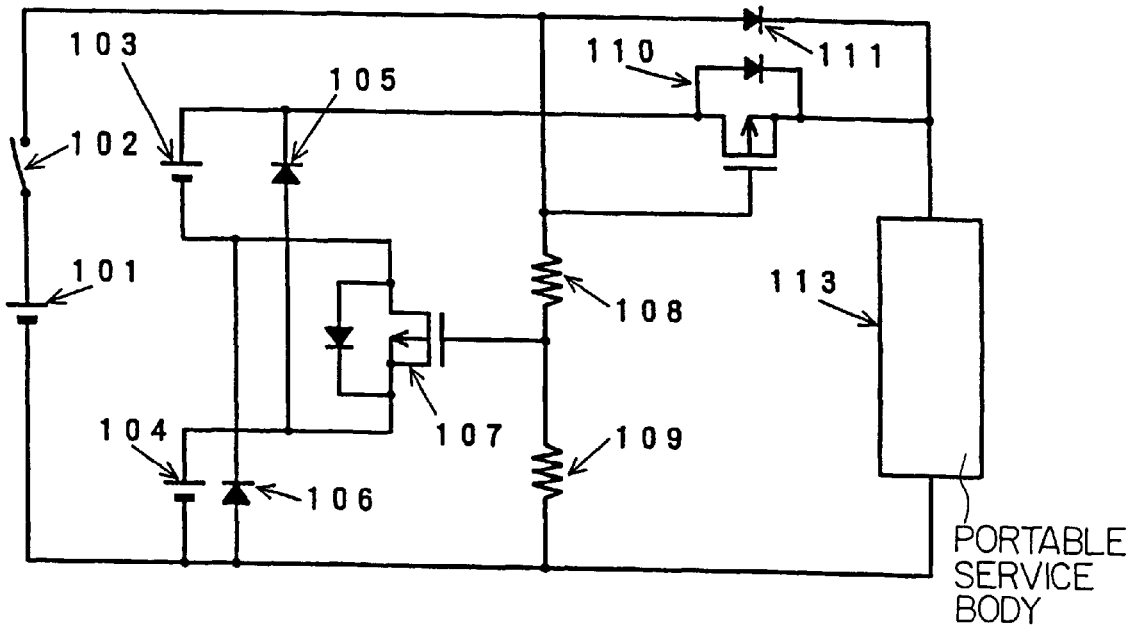
FIG. 1 is a block diagram showing a first embodiment of a power switching circuit according to the present invention.

In the power switching circuit of FIG. 1, a combination of an external power source 101 and a switch 102 represents an external power source (low-voltage source) supplied from the personal computer side, for example. This external power source 101 may, however, be a battery. The external power source 101 is connected to a portable device body 113 through the switch 102 and a diode 111.

Further, voltages from first and second built-in batteries 103 and 104, which are connected in series through a first P-channel FET 107, are connected to the portable device body 113 through a second P-channel FET 110. Each of these built-in batteries 103 and 104 may be a simple battery or include several batteries that are connected in series.

Resistors 108 and 109 are connected in series with the external power source 101 and the switch 102. The drain, source, and gate of the first P-channel FET 107 are connected to the negative electrode of the first built-in battery 103, the positive electrode of the second built-in electrode 104, and an intermediate point between the resistors 108 and 109, respectively. Further, the drain, source, and gate of the second P-channel FET 110 are connected to the positive electrode of the first built-in battery 103, a positive-electrode-side terminal of the portable device body 113, and an intermediate point between the switch 102 and the resistor 108, respectively.

The negative electrode of the external power source 101, the negative electrode of the second built-in battery 104, and a negative-electrode-side terminal of the portable device body 113 are grounded in common.

Further, a second diode 105 is connected between the positive electrode of the first built-in battery 103 and the positive electrode of the second built-in battery 104. Moreover, a third diode 106 is connected between the negative electrode of the first built-in battery 103 and the negative electrode of the second built-in battery 104.

(2) When Voltage of the External Power Source is Supplied to the Portable Device Body In supplying voltage from the external power source 101 to the portable device 113 via the first diode 111 with the switch 102 closed, the gate of the first P-channel FET 107 is supplied with the voltage from the external power source 101 divided by the resistors 108 and 109, while the gate of the second P-channel FET 110 is supplied with the voltage from the external power source 101.

Here let us suppose that the external power source 101 is 5 V, the voltages of the first and second built-in batteries 103 and 104 are 3 V, the resistor 108 is at 68 k$\Omega$, and the resistor 108 is at 100 k$\Omega$. Let us suppose, moreover, that the threshold value of the source-gate voltage for the conduction between the first and second P-channel FETs 107 and 110 is −0.3 V.

Thereupon, a voltage of 5*[100/(68+100)]=2.97 V ($\approx$3 V) and a voltage of 3 V from the second built-in battery 104 are supplied to the gate and source, respectively, of the first P-channel FET 107, whereupon the source-gate voltage is reduced substantially to 0 V, and the first P-channel FET 107 is cut off.

On the other hand, 5 V from the external power source is supplied to the gate of the second P-channel FET 110, and likewise, 5 V from the external power source is supplied to the source through the first diode 111, so that the source-gate voltage is reduced to 0 V, and the second P-channel FET 107 is also cut off.

When the switch 102 is closed, therefore, both the first and second P-channel FETs 107 and 110 are cut off, so that the voltages of the first and second built-in batteries 103 and 104 are stopped from being supplied to the portable device body 113, and the voltage of 5 V from the external power source 101 is supplied to the portable device body 113.

(3) When Voltage of the External Power Source is not Supplied to the Portable Device Body When the switch 102 is opened so that the external power source 101 and the portable device 113 are disconnected, the ground voltage of 0 V and a voltage of 3 V are supplied to the gate of the first P-channel FET 107 and the source of the second built-in battery 104, respectively. Thereupon, the source-gate voltage is reduced to approximately −3 V, and the first P-channel FET 107 is switched on.

On the other hand, the ground voltage of 0 V is supplied to the gate of the second P-channel FET 110, while a total voltage of 6 V from the first and second built-in batteries 103 and 104 is supplied to the source via the drain and a parasitic diode. Accordingly, the source-gate voltage becomes −6 V, and the second P-channel FET 110 is also switched on.

When the switch 102 is opened, therefore, both the first and second P-channel FETs 107 and 110 are switched on, whereupon the voltage of 6 V from the first and second built-in batteries 103 and 104 that are connected in series is supplied to the portable device body 113. As this is done, the first diode 111 prevents the voltage of 6 V of the built-in batteries 103 and 104 from flowing out toward the external personal computer.

(4) Bypass Diodes for Built-in Battery Replacement

The second and third diodes 105 and 106 are bypass diodes for the replacement of the built-in batteries. If the one built-in battery 104 is removed while the portable device is being disengaged from the personal computer (that is, while the voltage from the built-in batteries 103 and 104 is being supplied to the portable device body 113 with the switch 102 open, as described before in connection with (2)), the remaining built-in battery 103 supplies its voltage of 3 V to the portable device body 113 via the second P-channel FET 110 and the third diode 106 that are switched on. If the built-in battery 104 is removed after the built-in battery 104 is replaced with a new one, that built-in battery 104 supplies its voltage of 3 V to the portable device body 113 via the second P-channel FET 110 and the second diode 105 that are switched on.

Thus, if one of the two built-in batteries 103 and 104 is removed to be replaced, the remaining built-in battery continues to supply its voltage to the portable device body 113, so that memory contents and timer contents stored in a memory of the portable device body 113 can be maintained by utilizing that voltage during the battery replacement.

(5) Operating Voltage for the Power Switching Circuit

Figure 3:
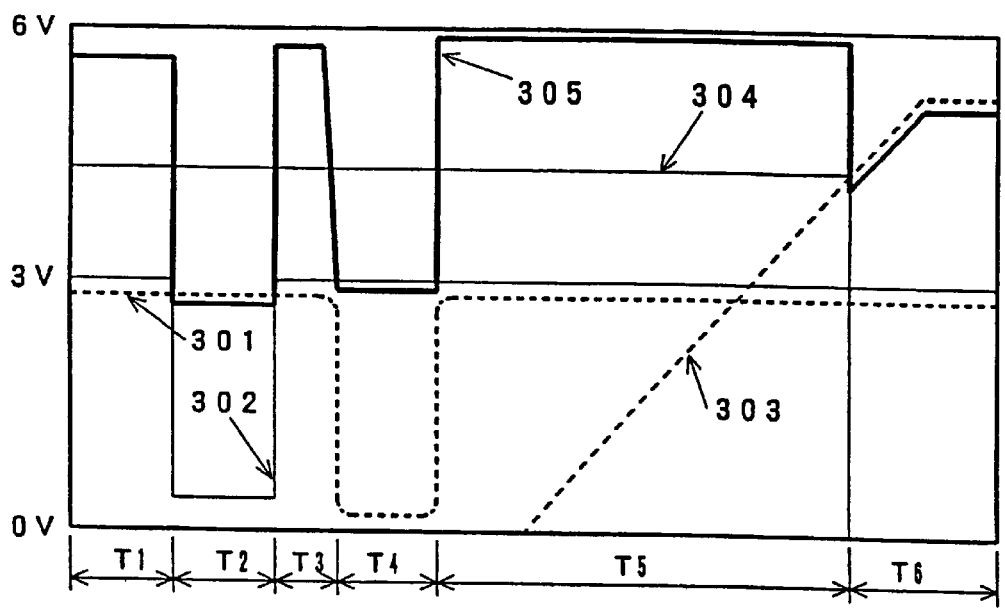
FIG. 3 is a diagram for illustrating the operation of the power switching circuit of FIG. 1.

Referring now to FIG. 3, time-based changes of the operating voltage of the power switching circuit of FIG. 1 will be described.

In FIG. 3, the axes of ordinate and abscissa represent the voltage level and time, respectively. Curves 301, 302, 303 and 305 represent the voltage of the first built-in battery 103, the voltage of the second built-in battery 104, an externally supplied voltage, and the level of voltage finally applied to the portable device body 113, respectively. A straight line 304 represents the threshold value level of conduction of the first P-channel FET 107.

In a section T1, the portable device is disengaged from the personal computer, and voltage (6 V) of the built-in batteries 103 and 104 is supplied to the portable device body 113. In FIG. 3, the supplied voltage of 6 V is represented by a curve 305.

A section T2 is a period during which the second built-in battery is disengaged from the portable device for replacement. As described before in connection with (3), therefore, the portable device body 113 is supplied with the voltage of 3 V from the first built-in battery 103.

A section T3 is a period during which the portable device is fitted again with both first and second built-in batteries after the second built-in battery had been replaced with another and the replaced one was mounted to the portable device. The voltage level for this section, like that for the section T1, is 6 V.

A section T4 is a period during which the first built-in battery is disengaged from the portable device for replacement. Therefore, the portable device body 113 is supplied with the voltage of 3 V from the second built-in battery.

In a section T5, the relation between the external power source and its switching with respect to time is shown in brief, which is established when the voltage of the external power source 101 is supplied to the body 113 of the portable device which is inserted in the personal computer after the first built-in battery had been replaced with another and the replaced one was mounted to the portable device.

During the period between the start of the section T5 and the attainment of a predetermined level (mentioned later) by the voltage of the external power source 101, the portable device body 113 is supplied with the voltage of 6 V of the first and second built-in batteries 103 and 104. As this is done, the first P-channel FET 107 is changed to be switched on. The voltage of 3 V of the second built-in battery 104 is supplied to the source of the first P-channel FET 107. When a voltage of 2.5 V or above is supplied to the gate of the FET 107, therefore, the source-gate voltage comes to −0.5 V or above, so that the first P-channel FET 107 becomes conductive. In order to supply the voltage of 2.5 V or above to the gate of the first P-channel FET 107, the voltage of the external power source 10 must be $2.5/[(68+100)/100]=4.2$ (V) or above. The numerical value 100 in this computational expression is the value (kΩ) of the resistor 109, and 68 is the value (kΩ) of the resistor 108. Thus, when the section T5 is started so that the voltage of the external power source 101 increases to reach 4.2 V, the first P-channel FET 107 is turned off. The level 304 of FIG. 3 represents this 4.2 V.

A period T6 starts when the voltage of the external power source 10 increases to reach 4.2 V so that the voltage of 6 V of the first and second built-in batteries 103 and 104 is not supplied to the portable computer body 113 any more. The voltage of the external power source 101 further increases from 4.2 V to 5 V and stabilizes at the value 5 V thereafter.

According to this embodiment, as seen from the above description, there is provided an excellent power switching circuit in which the external power-supply voltage can be supplied to the portable device on the basis of the voltage of one built-in battery that is lower than the voltage of the external power source, without causing dissipation of the built-in batteries, as long as the voltage of the external power source is not lower than a fixed value (e.g., 4.2 V or above)

although the voltage of the external power source is lower than the total voltage (e.g., 6 V) of a plurality of built-in batteries that are connected in series in the portable device.

Description of Second Embodiment

Figure 2:
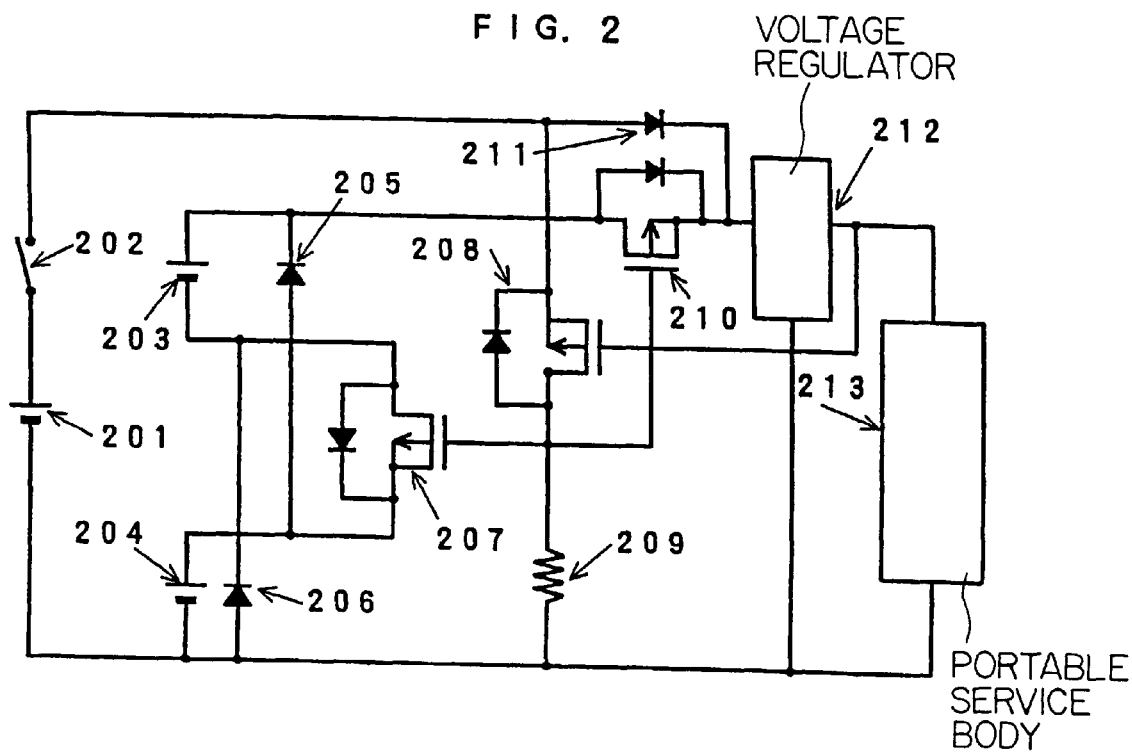
FIG. 2 is a block diagram showing a second embodiment of the power switching circuit according to the present invention.

Referring to the block diagram of FIG. 2, there will be described a second embodiment of the power switching circuit in a state where power of an external power source is supplied from the body of a personal computer to a card-type portable device that has batteries built-in and an interface based on the PCMCIA standards.

(1) Construction of the Power Switching Circuit

A switching circuit of this embodiment is substantially equivalent to a modified version of the switching circuit of the first embodiment shown in FIG. 1 in which a P-channel FET is used in place of the resistor 108, and moreover, a constant-voltage regulator is interposed between the first diode 111 and the portable device body 113.

When a switch 202 is closed, an external power source 201 supplies voltage to a portable device body 213 through a first diode 211 and a constant-voltage regulator 212. On the other hand, a first built-in battery 203 and a second built-in battery 204 are connected in series with a first P-channel FET 207 between them, and supply voltage to the portable device body 213 through a second P-channel FET 208 and the constant-voltage regulator 212.

A third P-channel FET 208 is connected between the positive-electrode side (switch 202) of the external power source 201 and the gate of the first P-channel FET 207. The source, drain, and gate of the third P-channel FET 208 are connected to the positive-electrode side of the external power source 201, the gate of the first P-channel FET 207, and the output side of the constant-voltage regulator 212.

The negative electrode of the external power source 201, the negative electrode of the second built-in battery 204, and a negative-electrode-side terminal of the portable device body 213 are grounded in common.

The gate of the first P-channel FET 207, the gate of the second P-channel FET 210, and the drain of the third P-channel FET 208 are connected to one another, and are connected to the aforesaid common ground through a resistor 209.

Further, a second diode 205 is connected between the positive electrode of the first built-in battery 203 and the positive electrode of the second built-in battery 204. Moreover, a third diode 206 is connected between the negative electrode of the first built-in battery 203 and the negative electrode of the second built-in battery 204.

(2) When Voltage of the External Power Source is Supplied to the Portable Device Body The switch 202 is closed, and voltage of the external power source 201 is supplied to the constant-voltage regulator 212 via the first diode 211. Thereupon, the constant-voltage regulator 212 supplies voltage of a given value to the portable device body 213.

Here let us suppose that the external power source 202 is 5 V, the voltages of the first and second built-in batteries 103 and 104 are 3 V, respectively, and the resistor 209 is at 100 kΩ. Let us suppose, moreover, that the threshold value of the source-gate voltage for the conduction between the first, second, and third P-channel FETs 207, 210 and 208 is −0.5 V. Further, the output voltage of the constant-voltage regulator 212 is supposed to be 3.3 V.

Thereupon, a voltage of 5 V of the external power source 201 and the output voltage of 3.3 V of the constant-voltage regulator 212 are supplied to the source and gate, respectively, of the third P-channel FET 208. In consequence, the third P-channel FET 208 is switched on because the source-gate voltage is −1.7 V, and both its drain and source are adjusted to the voltage of 5 V of the external power source 201. This voltage of 5 V is supplied to the gate of the first P-channel FET 207 and the gate of the second P-channel FET 210.

The gate and source of the first P-channel FET 207 are supplied with 5 V from the drain of the third P-channel FET 208 and 3 V of the second built-in battery 204, respectively. In consequence, the first P-channel FET 207 is turned off because the source-gate voltage is +2 V, and the first and second built-in batteries 203 and 204 are disconnected from each other.

Moreover, the gate and source of the second P-channel FET 210 are supplied with 5 V from the drain of the third P-channel FET 208 and a voltage of 5 V of the external power source 201 via the first diode 211, respectively. In consequence, the second P-channel FET 210 is turned off because the source-gate voltage is 0 V.

Thus, when the switch 202 is closed, the third P-channel FET 208 is switched on. In consequence, the first P-channel FET 207 and the second P-channel FET 210 are both turned off, and the voltage supply from the first and second built-in batteries 203 and 204 is stopped. The voltage of 5 V of the external power source 201 is supplied to the constant-voltage regulator 212, so that the constant-voltage regulator 212 supplies the stabilized voltage of 3.3 V to the portable device body 213.

(3) When Voltage of the External Power Source is not Supplied to the Portable Device Body When the switch 202 is opened so that the external power source 201 and the constant-voltage regulator 212 are disconnected, 3 V of the constant-voltage regulator 212 and 0 V of the external power source 201 are supplied to the gate and source, respectively, of the third P-channel FET 208. In consequence, the third P-channel FET 208 is turned off, having its source-gate voltage at +3.3 V.

Accordingly, the gate of the first P-channel FET 207 is grounded through the resistor 209 or is supplied with 0 V, and the source with 3 V of the second built-in battery 204. In consequence, the first P-channel FET 207 is switched on because the source-gate voltage is −3 V. Thus, the voltage of 6 V from the series-connected first and second built-in batteries 203 and 204 is supplied to the drain of the second P-channel FET 210.

Since a parasitic diode is interposed between the drain and source of the second P-channel FET 210, the voltage of 6 V is also supplied to the source. On the other hand, the gate is grounded through the resistor 209 and is at 0 V. In consequence, the second P-channel FET 210 conducts having its source-gate voltage at −6 V.

When no external power source is supplied (or when the switch 202 is open), therefore, both the first P-channel FET 207 and the second P-channel FET 210 are switched on, so that the voltage of 6 V of the series-connected first and second built-in batteries 203 and 204 is supplied to the constant-voltage regulator 212. At this time, the first diode 211 prevents this 6 V from flowing out. The constant-voltage regulator 212, supplied with 6 V, delivers the stabilized voltage of 3.3 V to the portable device body 213.

(4) Bypass Diodes for Built-in Battery Replacement

A description of the functions of the second and third diodes 205 and 206 as bypass diodes will be omitted since they are identical with those of the second and third diodes 105 and 106 according to the first embodiment.

(5) Operating Voltage for the Power Switching Circuit

When the portable device is inserted in the personal computer and the voltage of the external power source 201 is supplied to the portable device body 213, the voltage of 6 V of the first and second built-in batteries 203 and 204 is kept being supplied to the constant-voltage regulator 212 during the period which ends when the voltage of the external power source 201 rises to a predetermined level (to be explained later).

When the source-gate voltage of the third P-channel FET 208 rises to −0.5 V or above, the third P-channel FET 208 is switched on, as mentioned before. In consequence, the first and second P-channel FETs 207 and 208 are turned off, so that the voltage of 6 V of the first and second built-in batteries 203 and 204 ceases to be supplied to the constant-voltage regulator 212. The third P-channel FET 208, supplied at its gate with the output of 3.3 V of the constant-voltage regulator 212, is switched on when its source is supplied with a voltage of 3.8 (=3.3−(−0.5))V or above.

Thus, when a voltage of 3.8 V or above is supplied from an external power source in the case where the series-connected built-in batteries is 6 V, the voltage is supplied from the external power source to the portable device body.

According to this embodiment, as seen from the above description, there is provided an excellent power switching circuit in which the external power-supply voltage can be supplied to the portable device without causing dissipation of the built-in batteries, as long as the voltage of the external power source is not lower than a fixed value (e.g., 3.8 V or above) although the voltage of the external power source is lower than the voltage (e.g., 6 V) of a plurality of built-in batteries that are connected in series in the portable device.

Description of Third Embodiment

Referring to the block diagram of FIG. 4, there will be described a third embodiment of the power switching circuit in a state where power of an external power source is supplied from the body of a personal computer to a card-type portable device that has batteries built-in and an interface based on the PCMCIA standards.

(1) Construction of the Power Switching Circuit

First and second built-in batteries 403 and 404, which are connected in series with each other, supply voltage to a portable device body 418 through first and second P-channel FETs 414 and 415 and a constant-voltage regulator 417. On the other hand, voltage of an external power source 401 is supplied to the portable device body 418 through a switch 402, a third P-channel FET 416 and the constant-voltage regulator 417.

Figure 4:
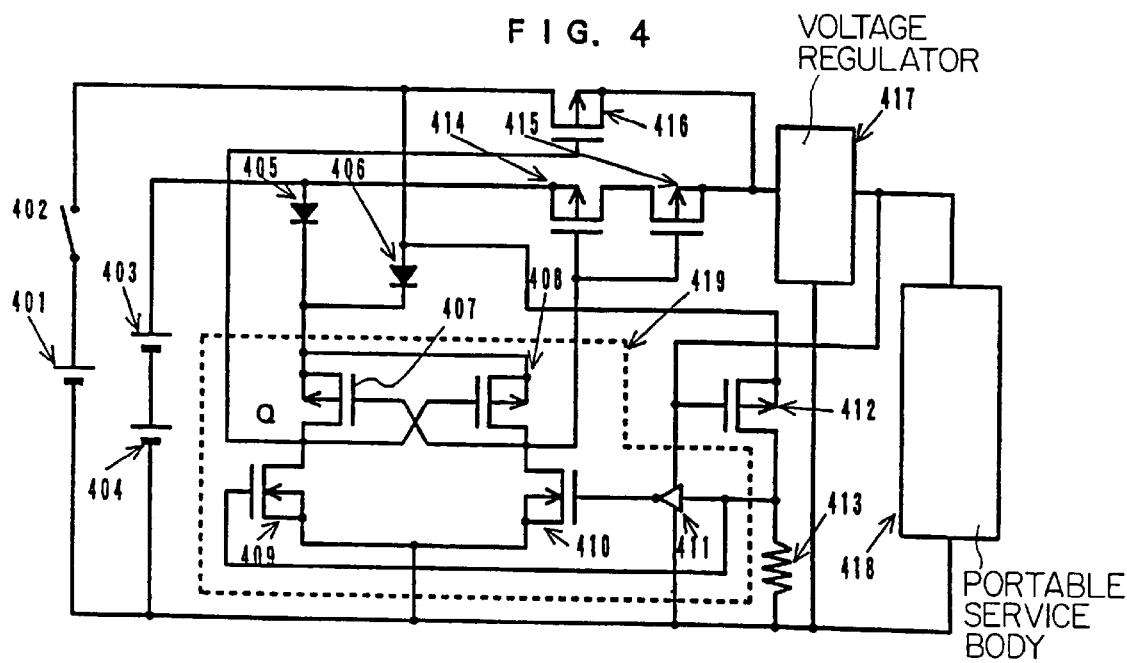
FIG. 4 is a block diagram showing a third embodiment of the power switching circuit according to the present invention.

An inverter 411, fifth P-channel FET 407, sixth P-channel FET 408, first N-channel FET 409, and second N-channel FET 410 constitute a flip-flop level shifter 419 (portion surrounded by dotted line in FIG. 4).

One output of the level shifter 419 is connected to the respective gates of the first and second P-channel FETs 414 and 415, while the other output of the level shifter 419 is connected to the gate of the third P-channel FET 416.

A power-supply voltage of the built-in batteries or the external power source, whichever may be higher, is supplied to the flip-flop of the level shifter 419 through the diodes 405 and 406 and an output voltage of the constant-voltage regulator 417 is supplied to the inverter 411.

The source, gate, and drain of a fourth P-channel FET 412 are connected to an external power source 401 (switch 402), connected to the output of the constant-voltage regulator 417, and grounded to a common potential through a resistor 413, respectively, thus constituting a voltage detection circuit of the external power source.

The source of the fourth P-channel FET 412 is an output of the voltage detection circuit, and the drain thereof is connected to the input of the level shifter 419.

Here let us suppose that the external power source 401 is at 5 V, the voltages of the first and second built-in batteries 403 and 404 are 3 V, the threshold value of the source-gate voltage of the fourth P-channel FET 412 is −0.5 V, and the output of the constant-voltage regulator 417 is 3.3 V.

(2) When Voltage of the External Power Source is Supplied to the Portable Device Body The switch 402 is closed, and voltage of the external power source 401 is supplied to the constant-voltage regulator 417 via the third P-channel FET 416. Thereupon, the constant-voltage regulator 417 supplies voltage of a given value to the portable device body 418.

Thus, the source and gate of the fourth P-channel FET 412 are supplied with the external power source 401 and the output voltage of 3.3 V of the constant-voltage regulator 417, respectively.

Accordingly, the source-gate voltage of the fourth P-channel FET 412 is −1.7 (=3.3−5)V, so that the fourth P-channel FET 412 is switched on. In consequence, the input of the level shifter 419 becomes equal to the external power-supply voltage of 5 V, and voltages "1" and "0" are supplied, respectively, to that output of the level shifter 419 which is connected to the respective gates of the first and second P-channel FETs 414 and 415 and the other output of the level shifter 419 that is connected to the gate of the third P-channel FET 416.

The level shifter 419 is supplied with the power-supply voltage from the built-in batteries or the external power source, whichever may be higher, through the diodes 405 and 406. In this case, therefore, the level shifter 419 is supplied with the series-connected voltage of 6 V of the first and second built-in batteries 403 and 404 that is higher than the voltage of 5 V of the external power source 401, so that the voltage corresponding to the output "1" of the level shifter is 6 V.

Consequently, as for the third P-channel FET 416, the source voltage and the gate voltage are 5 V and 0 V, respectively, so that the source-gate voltage is −5 V, with the result that the third P-channel FET 416 is switched on. As for the first P-channel FET 414, both the source voltage and the gate voltage are 6 V, so that the source-gate voltage is 0 V, with the result that the first P-channel FET 414 is switched off. As for the second P-channel FET 415, the source voltage and the gate voltage are 5 V and 6 V, respectively, so that the source-gate voltage is +1 V, with the result that the second P-channel FET 415 is switched off. Accordingly, the voltage of the first and second built-in batteries 403 and 404 is not applied to the constant-voltage regulator 417.

(3) When Voltage of the External Power Source is not Supplied to the Portable Device Body When the switch 402 is opened so that the external power source 401 is not supplied, current ceases to flow through the fourth P-channel FET 412 to the resistor 413, so that the input of the level shifter 419 is lowered to 0 V.

In consequence, the voltage of "0" is supplied to the output of the level shifter 419 that is connected to the respective gates of the first and second P-channel FETs 414 and 415, while the voltage of "1" is supplied to the other output of the gate of the third P-channel FET 416. Also in this case, the voltage corresponding to the output "1" of the level shifter is 6 V.

Consequently, as for the first P-channel FET 414, the source voltage and the gate voltage are 6 V and 0 V, respectively, so that the source-gate voltage is −6 V, with the result that the first P-channel FET 414 is switched on. As for the second P-channel FET 415, the source voltage and the gate voltage are 6 V and 0 V, respectively, so that the source-gate voltage is −6 V, with the result that the second P-channel FET 415 is switched on, too. As for the third P-channel FET 416, both the source voltage and the gate voltage are 6 V, respectively, so that the source-gate voltage is 0 V, with the result that the third P-channel FET 416 is switched off. Accordingly, the voltage of the first and second built-in batteries 403 and 404 is applied to the constant-voltage regulator 417.

Figure 5:
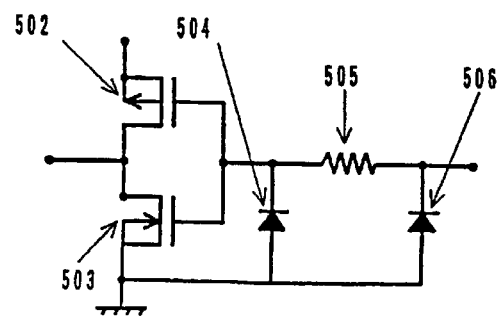
FIG. 5 shows an equivalent circuit of an inverter in a level shifter circuit in FIG. 4.
Figure 6:
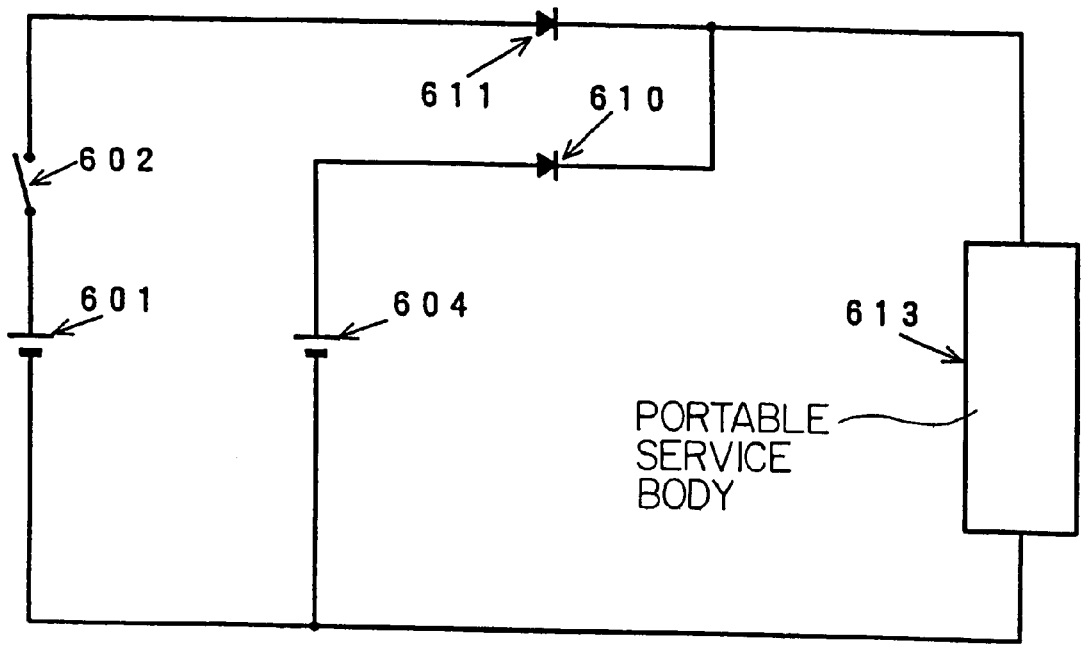
FIG. 6 shows an example of a conventional power switching circuit.
Figure 7:
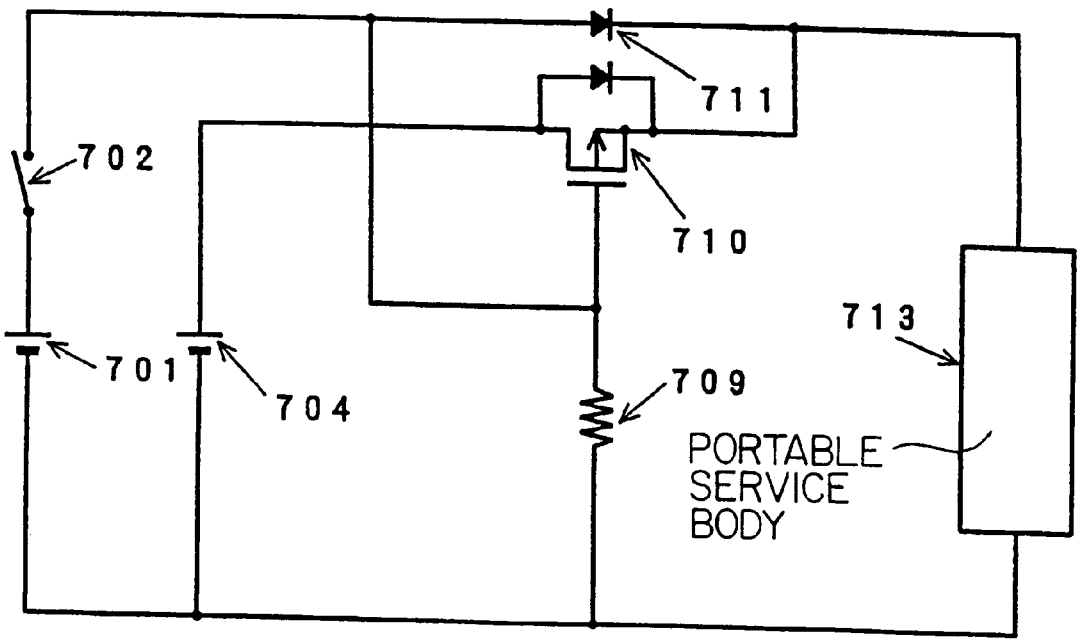
FIG. 7 shows another example of the conventional power switching circuit.

Referring to FIG. 5 showing an equivalent circuit, the inverter 411 used in the level shifter 419 of FIG. 4 will be described in detail.

The inverter 411 has a CMOS structure as its basic structure, including an N-channel FET 502 and a P-channel FET 503, which is accompanied with an n-type gate protection circuit composed of diodes 504 and 506 having a common anode and a resistor 505. A cutoff voltage higher than the source voltage of the P-channel FET 503 can be applied to the gate of this MOS.

I claim:

1. A power switching circuit for a portable device, comprising:

a first power supply line which supplies power of an external power source to the portable device body when connected to the external power source; and a second power supply line which supplies power of first and second built-in batteries, connected in series through a first switching device, to the portable device body through a second switching device, wherein said second power supply line includes bypass circuits designed such that, even when any one of the first and second built-in batteries is disengaged, power from the other built-in battery can be supplied to the portable device body through said second switching device, whereby one of the first and second built-in batteries is caused to supply power to the portable device body through the second switching device when the first switching device is switched off, said first switching element, receiving a value related to a voltage of the external power source and the voltage of any one of the first and second built-in batteries, is turned off only when the value obtained by subtracting the latter from the former is greater than a threshold value proper to said first switching device, and said second switching element, receiving the value related to the voltage of the external power source and the voltage of the first and/or the second built-in batteries or voltage of said external power source, which may be higher, is turned off only when the value obtained by subtracting the latter from the former is greater than a threshold value proper to said second switching device.

2. A power switching circuit for a portable device according to claim 1, wherein said value related to the value of the voltage of the external power source, received by said first switching device, is a division of the voltage of the external power source, which is obtained from the junction of two resistors connected in series with said external power source, and said value related to the value of the voltage of the external power source, received by said second switching device, is the voltage from the external power source.

3. A power switching circuit for a portable device according to claim 1, wherein said first power supply line is provided with a back-flow preventing diode for preventing the voltage of the first and second built-in batteries from flowing out through the first power supply line toward the external power source.

4. A power switching circuit for a portable device according to claim 2, which further comprises a constant-voltage regulator for outputting a fixed voltage value without regard to the value of input voltage, between said portable device body and the junction of the portable device body side of said back-flow preventing diode provided in said first power supply line and the portable device body side of the second switching device provided in said second power supply line, and wherein said external power source is connected with a third power supply line including a third switching device in parallel with said first power supply line, said third switching device of said third power supply line, receiving the output voltage of said constant-voltage regulator and the voltage of the external power source, is turned off only when a value obtained by subtracting the latter from the former is greater than a threshold value proper to said third switching device, said value related to the value of the external power source, received by said first switching device, is the value of voltage supplied from the external power source through said third switching device, and said value related to the value of the external power source, received by said second switching device, is the value of voltage supplied from the external power source through said third switching device.

5. A power switching circuit for a portable device according to claim 1, wherein said first switching device is a P-channel FET, the gate of which receives the value related to the value of the voltage of said external power source, and the source of which receives the value of the voltage of one of the first and second built-in batteries.

6. A power switching circuit for a portable device according to claim 1, wherein said second switching device is a P-channel FET, the gate of which receives the value related to the value of the voltage of said external power source, and the source of which receives the value of the voltage of the first and/or second built-in battery or the value of the voltage of the external power source, whichever may be higher.

7. A power switching circuit for a portable device, comprising:

a first power supply line adapted to supply power from an external power source to the portable device body through a first switching device and a constant-voltage regulator when connected to the external power source;

a second power supply line for supplying power from a built-in battery to said constant-voltage regulator through second switching devices; and a level shifter which receives the voltage from the external power source, when the voltage of the external power source is higher than the sum of an output of said constant-voltage regulator and a predetermined value, and delivers voltage to said first switching device such that said first switching device is turned on, delivers voltage to said second switching device such that said second switching device is turned off, receives zero voltage when the voltage of the external power source is not higher than the sum of the output of said constant-voltage regulator and the predetermined value, delivers voltage to said first switching device such that said first switching device is turned off, and delivers voltage to said second switching device such that said second switching device is turned on.

* * * * *